(12) United States Patent
Karki et al.

(10) Patent No.: US 12,732,492 B2
(45) Date of Patent: Sep. 8, 2026

(54) PLACEMENT OF HOSTS BASED ON AUTHENTICATION SERVER STATUS

(71) Applicant: Arista Networks, Inc., Santa Clara, CA (US)

(72) Inventors: Siddarth Karki, Bangalore (IN); Wenyi Cheng, Burlingame, CA (US); Manish Singhvi, Bangalore (IN); Ganesan Rajagopal, Bangalore (IN)

(73) Assignee: Arista Networks, Inc., Santa Clara, CA (US)

( * ) Notice: Subject to any disclaimer, the term of this patent is extended or adjusted under 35 U.S.C. 154(b) by 360 days.

(21) Appl. No.: 18/308,028

(22) Filed: Apr. 27, 2023

(65) Prior Publication Data

US 2024/0259362 A1 Aug. 1, 2024

Related U.S. Application Data

(60) Provisional application No. 63/482,431, filed on Jan. 31, 2023.

(51) Int. Cl.
*H04L 9/40* (2022.01)

(52) U.S. Cl.
CPC ............ *H04L 63/08* (2013.01); *H04L 63/205* (2013.01)

(58) Field of Classification Search
CPC .............................. H04L 63/08; H04L 63/205
See application file for complete search history.

(56) References Cited

U.S. PATENT DOCUMENTS 10,375,003 B1 * 8/2019 Olsen ..................... G06Q 40/02
2010/0169953 A1 * 7/2010 Hofer ...................... H04L 63/08 726/3
2011/0023095 A1 * 1/2011 Lo ......................... H04L 63/102 726/4
2013/0212385 A1 * 8/2013 Schechter .............. G06F 21/31 713/168

(Continued)

FOREIGN PATENT DOCUMENTS

JP 2001060184 3/2006

OTHER PUBLICATIONS

Yoshio et al., "Identity Continuance in Single Sign-On with Authenttication Server Failure", 2011 Fifth International Conference on Innovative Mobile and Internet Services in Ubiquitous Computing, Jun. 30, 2011, IEEE Publishing.*

(Continued)

*Primary Examiner* — Todd L Barker
(74) *Attorney, Agent, or Firm* — Sprinkle IP Law Group

(57) ABSTRACT

Systems and methods for the tracking and use of the status of authentication servers by a network device are disclosed. Embodiments as disclosed may maintain a responsiveness status reflecting the responsiveness of each authentication server in a network at a network device utilized as an authenticator. When a request for authentication is received from a host at the network device the status of each of the plurality of the authentication servers can be checked. Only those authentication servers indicated as responsive may be utilized to attempt authentication. If the status of all authentication servers indicates that all the authentication servers are in an unresponsive state, an unresponsive action can be taken based without actually attempting to authenticate the host using those authentication servers.

16 Claims, 5 Drawing Sheets

(56) References Cited

U.S. PATENT DOCUMENTS

2016/0277509 A1* 9/2016 Qiang ................. H04L 67/1001
2018/0082304 A1* 3/2018 Summerlin ........ G06Q 20/3229
2020/0026604 A1* 1/2020 Miedziejewski ... G06F 11/1423

OTHER PUBLICATIONS

Kreutz et al., "Towards Secure and Dependable Authentication and Authorization Infrastructures", 2014 IEEE 20th Pacific Rim International Symposium on Dependable Computing,Nov. 18, 2014, IEEE Publishing.*
European Search Report issued by the European Patent Office for European Patent Application No. 24154654.8, mailed Apr. 3, 2024, 16 pages.
"VOSS User Guide—For VOSS Release 8.9," Extreme Networks, Inc., Dec. 2022, 4129 pages.
"Ruckus FastIron Security Configuration Guide, 09.0.10," © 2022 CommScope, Inc., May 23, 2022, 337 pages.
C. Rigney et al., Remote Authentication Dial in User Service (Radius), Internet Engineering Task Force (IETF), Jun. 2000, 76 pages.
A. DeKok, "Use of Status-Server Packets in the Remote Authentication Dial in User Service (Radius) Protocol," Internet Engineering Task Force (IETF), Aug. 2010, 24 pages.
European Examination Report issued by the European Patent Office for European Patent Application No. 24154654.8, mailed Dec. 22, 2025, 6 pages.

* cited by examiner

PLACEMENT OF HOSTS BASED ON AUTHENTICATION SERVER STATUS

RELATED APPLICATIONS

This patent application claims the benefit of priority under 35 U.S.C. 119 to U.S. Provisional Patent Application Ser. No. 63/482,431, filed Jan. 31, 2023, entitled "Placement of Hosts Based on Authentication Server Status" by inventors Karki et al., which is incorporated herein in its entirety by reference for all purposes.

BACKGROUND

Security in computer networks is becoming more critical and complex as networks are increasingly relied upon for communications in a variety of applications and settings. In most network architectures, security on these networks involves the authentication of devices or users using some security mechanism or protocol.

The authentication of such devices or messages is typically accomplished using an authentication protocol, where that authentication protocol is implemented using one or more authentication servers. One example of such a protocol is Remote Authentication Dial-In User Service (RADIUS).

These authentication servers may, however, fail or otherwise become unresponsive. In certain contexts, it may be desirable that some level of access still be provided to a device or user in cases where authentication of that device or user fails. The failure of one or more of the authentication servers that may be used to authenticate a user or device may, however, delay either authentication and or the granting of access to the user or device when authentication fails. These delays may originate, at least in part, from attempts to authenticate the device or user with the failed authentication servers.

What is desired then, is to authenticate devices or users in a network environment more quickly and to grant access to the network more promptly in cases where authentication servers involved in such authentication are unresponsive.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
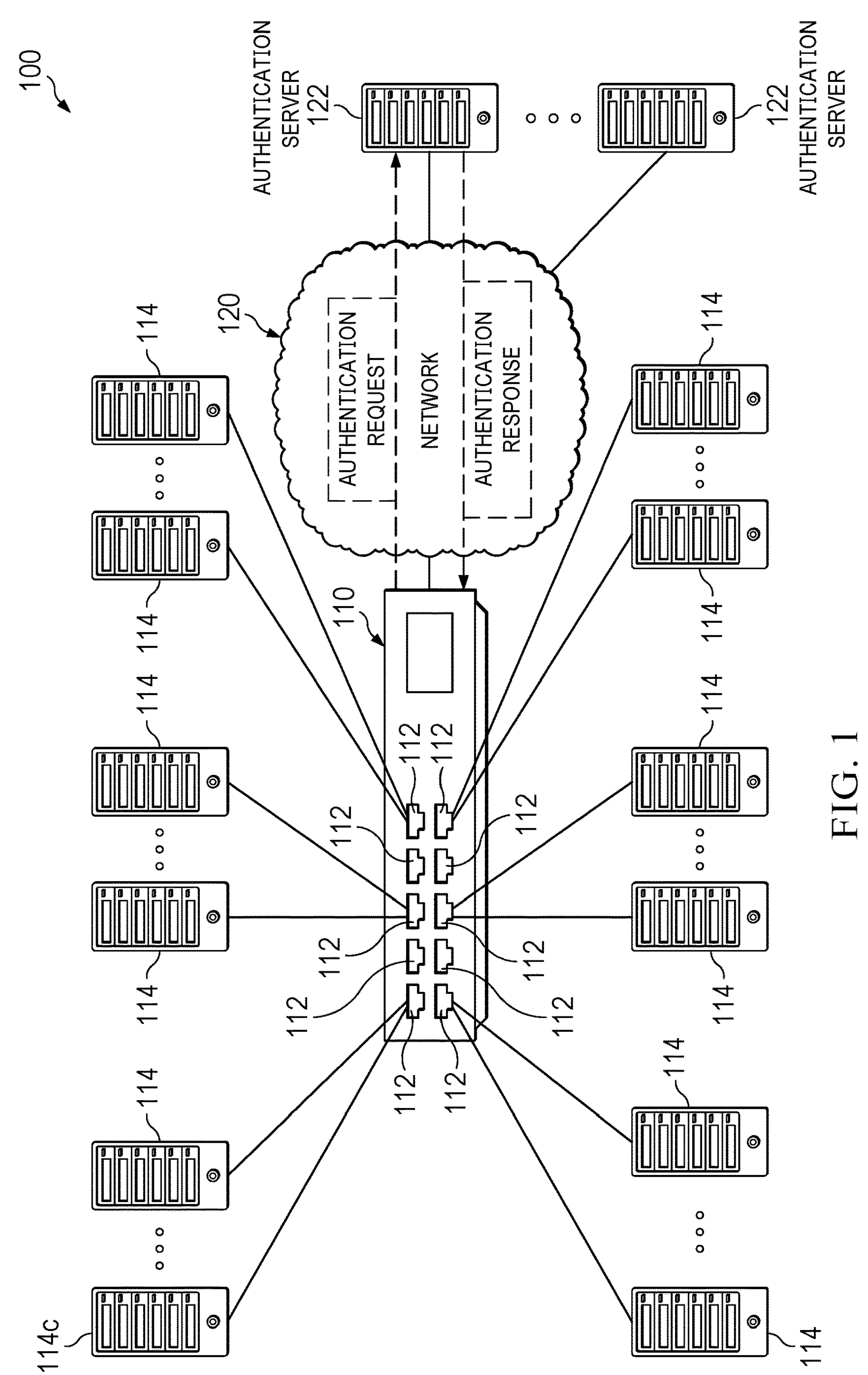
FIG. 1 is a block diagram illustrating a network environment including an embodiment of a network device and authentication server.

As discussed, security in computer networks is becoming more critical and complex as networks are increasingly relied upon for communications in a variety of applications and settings. In typical network architectures, devices (hosts) communicating in the network are connected to a network interface of a network device, such as a router or switch, which controls the flow of packets in the network. These network devices may thus be utilized to control access to such networks.

To give an example, one type of networked environment in which network devices may be effectively utilized to control access is referred to as a "campus" environment. A campus network can be thought of as a proprietary local area network (LAN) (or set of interconnected LANs) serving a university, corporation, government agency, or other organization or entity. Oftentimes in these sorts of network environments users desire to join, or access, the campus network, and do so through a network device in the campus network. For example, users in a conference room or classroom may access a campus network through a wired or wireless interface provided by a network device in the network.

In these types of scenarios, campus (or other types of) networks typically have some form of authentication or validation in place. This authentication can be done using authentication, authorization, and accounting (AAA), a widely used standard-based framework for controlling who is permitted to use network resources (through authentication), what they are authorized to do (through authorization), and capturing the actions performed while accessing the network (through accounting). In particular, many of these networks may authenticate users according to IEEE 802.1X, an authentication protocol to allow access to networks using an authentication server.

Hosts (e.g., users at host devices) may thus access the campus network through a network device (e.g., a router or switch) serving as an authenticator. The network device can authenticate the host device using the authentication server based on credentials provided by the host device and allow, block, or otherwise control network traffic between the host and the campus network based on the result of the authentication.

Remote Authentication Dial-In User Service (RADIUS) is one example of a protocol that can be used by such an 802.1X authenticator to validate a user (referred to as an 802.1X supplicant, or just supplicant) by communicating with an AAA server (the RADIUS server) in an 802.1X topology. It can also be used to validate local authentication attempts. Generally, during an authentication session, the network device sends an authentication request (e.g., an access request, etc.) to the authentication server when a host is attempting to access the network. The authentication server can then return an authentication response (e.g., an access-accept response, access-reject, access-challenge response, etc.). To illustrate in more detail, when authenticating a supplicant, a network device can generate a RADIUS Access-Request message with several properties describing the supplicant, and with a property wrapping a supplicant's Extensible Authentication Protocol (EAP) message. The server then generates a RADIUS response (which may be a challenge), potentially with a wrapped Extensible Authentication Protocol (EAP) response for the supplicant.

In many cases, for a variety of reasons (e.g., to ensure fault tolerance, to provide load balancing or more rapid response times, etc.) multiple RADIUS servers may be employed in these types of network environments. Thus, a network device serving as an authenticator is configured with these multiple RADIUS servers, and may also be configured with an order associated with those multiple RADIUS servers. Thus, when a supplicant attempts to authenticate through the network device, an authentication request may be provided to each configured RADIUS server according to the configured order of those RADIUS servers. This authentication process may be done serially. In other words, at the point the network device determines the first RADIUS server in the configured order is unresponsive (e.g., because of network maintenance, RADIUS server failure, or some other reason), the authentication request is then made to the next configured RADIUS server. This process repeats until the supplicant is authenticated by one of the RADIUS servers (or fails authentication), or all of the configured RADIUS servers have been deemed unresponsive.

In these campus (or other) network environments it may be desired that a lesser, or minimum, level of access still be provided to a host in cases where authentication of that supplicant fails (e.g., because all of the RADIUS servers are unresponsive). This type of access can be granted in these circumstances by configuring the network device with a fallback configuration or the like, such that when authentication of the supplicant fails (e.g., because of all RADIUS servers being unresponsive) the host can be placed in an "unresponsive" Virtual Local Area Network (VLAN) granting limited access to the network.

It may be realized after reading the above that a supplicant may have no access to the network until the supplicant is successfully authenticated by a RADIUS server, or the supplicant is placed in an unresponsive VLAN (e.g., all configured RADIUS servers have been tried and deemed unresponsive). The delays involved in the serial authentication attempts utilizing multiple RADIUS servers (which may or may not be responsive) in a previously configured static order, and the commensurate delay in placing the host in an unresponsive VLAN (or other fallback configuration), are not insignificant, and can be very inconvenient from a user's perspective.

What is desired then, is to more rapidly authenticate supplicants in an 802.1x environment and, similarly, to more rapidly grant access to the network to such supplicants in cases where the authentication servers involved in such authentication are unresponsive.

To address those desires, among others, embodiments of network devices may track the status of each of a plurality of RADIUS servers that may be used for authentication in the network environment. In this manner, a responsiveness status reflecting the responsiveness of each RADIUS server can be maintained at the network device. When a request for authentication is received from a supplicant at the network device the status of each of the plurality of the RADIUS servers can be checked. If the status of all the RADIUS servers indicate that all the RADIUS servers are in an unresponsive state, an (unresponsive) action can be taken based on the fallback configuration of the network device without actually attempting to authenticate the supplicant at any of the RADIUS servers. For example, the supplicant may be immediately placed in an unresponsive VLAN without any attempted authentications. If it is subsequently determined that a RADIUS server is now in a responsive state, an authentication of the supplicant may occur at that point (e.g., with the now responsive RADIUS server).

If, however, there are RADIUS servers associated with a responsive state at the time the request for authentication is received from the supplicant, the network device may attempt authentication of the supplicant utilizing those responsive RADIUS servers (e.g., regardless of any order for those RADIUS servers configured at the network device). In some embodiments, the network device may also utilize the configured order of the RADIUS servers in concert with the maintained status of each of the plurality of RADIUS servers to determine an order of RADIUS servers to utilize for authentication in cases where one or more RADIUS servers is associated with a responsive state. In particular, the network device can determine a RADIUS server that is highest in the configured order that is also associated with a responsive state and utilize this RADIUS server to attempt to authenticate the supplicant first. If this RADIUS server is unresponsive the network device may determine the RADIUS server that is next highest in the configured order and is associated with a responsive state. The network device can then utilize this next RADIUS server to attempt to authenticate the supplicant. The determination of responsive RADIUS servers to utilize for authentication based on the configured order can continue in this manner until the supplicant is authenticated (or fails authentication) or the set of RADIUS servers in the responsive state are exhausted (e.g., all responsive RADIUS servers have been tried).

Specifically, according to embodiments, to track the status of each RADIUS server a probe communication may be sent to each RADIUS server at (e.g., the beginning of) a probe interval. A probe communication can, for example, be a RADIUS Status-Server packet. When there is no response to that probe communication from that RADIUS server, the failure of that probe communication can be tracked in association with that RADIUS server. This tracking may entail incrementing a failed probe count associated with that RADIUS server. Based on the failure of one or more probe communications the responsiveness status of the RADIUS server may be set to an unresponsive state (e.g., "not alive", "down", etc.). For example, if the failed probe count associated with the RADIUS server exceeds a failed probe count threshold (e.g., one failed probe, ten failed probes, etc.) the status of that RADIUS server may be set to the unresponsive state. As another example, a time since a last response was received from the RADIUS server may be tracked and when this time exceeds a threshold the status of the RADIUS server may be set to the unresponsive state.

While in certain embodiments any response from the RADIUS server may be identified as a response to a probe communication, in some embodiments only a RADIUS Access-Accept response will be deemed a response to a probe communication. Moreover, in some cases only a response received to a probe communication within the probe interval may be identified as a response to that probe communication. Thus, if a response is received to a probe communication but the response is received outside the probe interval (e.g., after the expiration of a probe interval after that probe communication is sent) such a response may not be identified as a response to the probe communication. Thus, at the end of a probe interval, the failed probe count associated with the RADIUS server may be incremented if no response to a probe communication (e.g., sent at the beginning of that probe interval) has been identified. If this failed probe count exceeds a failed probe count threshold at that point the status of that RADIUS server may be set to the unresponsive state. When the status of a RADIUS server is set to an unresponsive state, probe communications may continue to be sent to that RADIUS server by the network device (e.g., at the probe interval). If a response to a probe communication from that RADIUS server is subsequently identified (e.g., a response is received to the probe communication within the probe interval), the responsiveness status of that RADIUS server may be returned to a responsive state (e.g., "alive", "up", etc.).

Embodiments therefore may have a number of advantages. For example, supplicants can be more quickly authenticated or placed into fallback configurations proactively, rather than introducing a delay when authentication with unresponsive RADIUS servers is attempted serially.

Before describing embodiments in more detail, It may be helpful to an understanding of embodiments to generally discuss the operation of embodiments of such network devices in a network environment, including authentication in such a network environment. It should be noted that while embodiments as described and disclosed herein are described and presented with respect to authentication of hosts using the RADIUS protocol, embodiments may be effectively applied in almost any computing context where authentication using remote authentication servers is utilized, and all such embodiments are fully contemplated herein.

Referring then to FIG. 1, a network environment 100 includes a network device 110 (such as a switch or a router) comprising a plurality of network interfaces 112 to which hosts 114 are connected (e.g., through a wired or wireless connection) to access network 120. The network device 110 controls the flow of packets from hosts 114 into and out of network device 110 and onto the network 120.

Embodiments of network device 110 can be usefully applied in certain network environments, such as when the network device 110 is utilized as an authenticator in a network environment 100. Here, in order to gain access to network 120, hosts 114 need to be authenticated. Network device 110 serves as an authenticator in network environment 100 to authenticate these hosts 114 using an authentication server 122 (such as a RADIUS server or the like), and can control network traffic between the hosts 114 and the network 120 based on the result of the authentication. Generally, during an authentication session, the network device 110 sends an authentication request (e.g., an access request, etc.) to an authentication server 122 when a host 114 is attempting to access the network 120. That authentication server 122 can then return an authentication response (e.g., an access-accept response, access-reject, access-challenge response, etc.). To illustrate in more detail, when authenticating a host 114 (e.g., a user at the host 114), network device 110 can generate a RADIUS Access-Request message with several properties describing that host 114 (referred to herein also as a supplicant without loss of generality). The server 122 then generates a RADIUS response (which may be a challenge), potentially with a wrapped EAP-response for the host 114.

These RADIUS messages have authentication fields (e.g., the Request/Response Authenticator and the Message-Authenticator attribute) that are calculated using a mathematical function such as an MD5 hash or the like. The values for these authenticator fields may be generated using a secret (value) shared between the network device 110 and the authentication server 112. Specifically, the shared secret (also referred to as a key) is appended to the contents of a message (e.g., packet) and the result hashed to produce the value for the authenticator field.

According to the RADIUS protocol, then, the network device 110 or authentication server 122 must validate messages passing between them based on this shared secret when appropriate conditions are met and will drop packets if their authentication field doesn't match what is locally calculated. The RADIUS protocol also specifies that the authenticator value may be generated on a per-packet basis. In request messages, the generation of the authenticator field (e.g., the hash) is based only on the message itself and the shared secret, or is unilaterally generated and cannot be checked (e.g., depending on the type of the message). In replies, the authenticator field (e.g., the hash) is based on the authenticator field of the corresponding request being replied to and the shared secret.

For a variety of reasons (e.g., to ensure fault tolerance, to provide load balancing or more rapid response times, etc.) multiple authentication servers 122 may be employed in these types of network environments. Thus, network device 110 serving as an authenticator can be configured to utilize these multiple authentication servers 122, and may also be configured with a particular ordering (e.g., hierarchy, priority, etc.) associated with those multiple authentication servers 122. Thus, when a host 114 attempts to authenticate through the network device 110, an authentication request may be provided to one or more authentication servers 122 according to the configured order of those authentication servers 122.

This authentication process may be done serially. In other words, at the point the network device 110 determines the first authentication server 122 in the configured order is unresponsive (e.g., because of network maintenance, authentication server failure, or some other reason), the authentication request is then made to the next configured authentication server 122. This process repeats until the hot 114 is authenticated by one of the authentication servers 122 (or fails authentication), or all of the configured authentication servers 122 have been deemed unresponsive.

Embodiments of network device 110 may be adapted to provide a lesser, or minimum, level of access to a host 114 in cases where authentication of that host 114 fails. This type of access can be granted in these circumstances by, for example, configuring the network device 110 with a fallback configuration or the like, such that when authentication of the host 114 fails (e.g., because all authentication servers 122 are unresponsive) the host 114 can be placed in a particular (e.g., referred to as an "unresponsive") Virtual Local Area Network (VLAN) granting limited access to the network 120.

In order to facilitate this authentication (or taking of an unresponsive action such as placing the host 114 in an unresponsive VLAN), embodiments of network device 110 are adapted to track the status of each authentication server 122 that may be used for authentication in the network environment. In this manner, a responsiveness status reflecting the responsiveness of each authentication server 122 can be maintained at the network device 110. When a request for authentication is received from a host 114 at the network device 110 the status of each of the plurality of authentication servers 122 can be checked. If the status of all the authentication servers 122 servers indicate that all the authentication servers 122 are in an unresponsive state, an (unresponsive) action can be taken by the network device 110 (e.g., based on the fallback configuration of the network device 110) without actually attempting to authenticate the host 114 at any of the authentication servers 122. For example, the host 114 may be immediately placed in an unresponsive VLAN without any attempted authentications. If it is subsequently determined that an authentication server 122 is now in a responsive state, an authentication of the host 114 may occur at that point (e.g., with the now responsive authentication server 122).

If, however, there are authentication servers 122 associated with a responsive state at the time the request for authentication is received from the host 114 at the network device 110, the network device 110 may attempt authentication of the host 114 utilizing those responsive authentication servers 122 (e.g., regardless of any order for those authentication servers 122 configured at the network device). In some embodiments, the network device may also utilize a configured order of the authentication servers 122 in concert with the maintained status of each of the plurality of authentication servers 122 to determine an order of authentication servers 122 to utilize for authentication in cases where one or more authentication servers 122 is associated with a responsive state. In particular, the network device 110 can determine an authentication server 122 that is highest in the configured order that is also associated with a responsive state and utilize this authentication server 122 to attempt to authenticate the host 114 first. If this authentication server 122 is unresponsive the network device 110 may determine the authentication server 122 that is next highest in the configured order and is associated with a responsive state. The network device 110 can then utilize this next authentication server 122 to attempt to authenticate the host 114, The determination of responsive authentication servers 122 to utilize for authentication based on the configured order can continue in this manner until the host 114 is authenticated (or fails authentication) or the set of authentication servers 122 in the responsive state are exhausted (e.g., all responsive authentication servers 122 have been tried).

Figure 2:
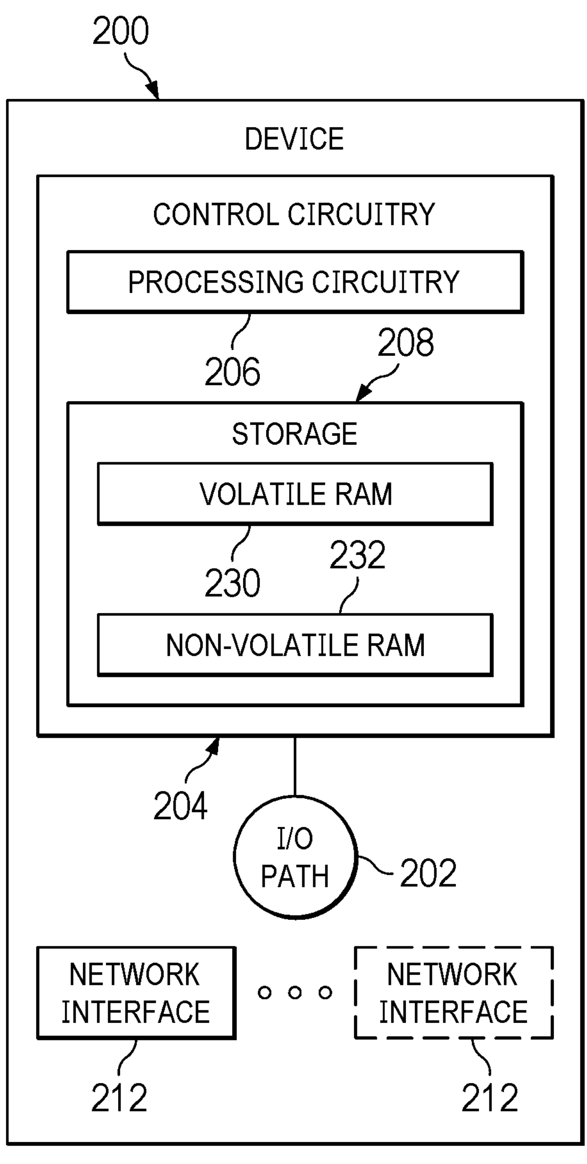
FIG. 2 is a block diagram depicting a general architecture of one embodiment of a network device for authentication and placement of hosts using authentication server status.

FIG. 2 is a block diagram depicting a general architecture of a network device for tracking the status of authentication servers and using that status in the authentication of hosts in the network environment in accordance with certain embodiments. Network device 200 may be a router, switch, server, or any other computing device that may be configured to control or process network traffic. The network device 200 may receive data, including packets from hosts (not shown), via an input/output (I/O) path 202. I/O path 202 may provide packet data to control circuitry 204, which includes processing circuitry 206 and storage (i.e., memory) 208. Control circuitry 204 may send and receive commands, requests, and other suitable data using I/O path 202. I/O path 202 may connect control circuitry 204 (and specifically processing circuitry 206) to one or more network interfaces 212 to which other devices of a network (e.g., hosts) can be connected. These network interfaces 212 may be any type of network interface, such as an RJ45 ethernet port, a coaxial port, etc.

Control circuitry 204 includes processing circuitry 206 and storage 208. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, octa-core, or any suitable number of cores). In some embodiments, processing circuitry 206 is distributed across multiple separate processors or processing units, for example, multiple of the same type of processing units or multiple different processors. The circuitry described herein may execute instructions included in software running on one or more general purpose or specialized processors.

Storage 208 may be an electronic storage device that includes volatile random-access memory (RAM) 230, which does not retain its contents when power is turned off, and non-volatile RAM 232, which does retain its contents when power is turned off. As referred to herein, the phrase "electronic storage device" or "storage device" should be understood to mean any device for storing electronic data, computer software, instructions, or firmware, such as RAM, content-addressable memory (CAM) (including a TCAM), hard drives, optical drives, solid state devices, quantum storage devices, or any other suitable fixed or removable storage devices, or any combination of the same.

According to embodiments, a plurality of authentication servers may be configured at the network device where an identification of these authentication servers may be stored in storage 208. Additional configurations stored in storage 208 may include, for example, a preferred order of use of the configured authentication servers, a probe interval for sending probe communications, a failed probe count threshold for determining when an authentication server will be deemed unresponsive and a fallback configuration indicating an action to be taken when a host cannot be authenticated. Such configurations can be established by an administrative or other type of user through an interface such as a command line interface (CLI) or the like provided by the network device 200.

Control circuitry 204 executes instructions for implementing the tracking of the responsiveness status of configured authentication servers, and using that status in the authentication of hosts in the network environment. For example, the control circuitry 204 may be adapted to track the status of the authentication servers by sending a probe communication (also referred to herein interchangeably as a message or packet) to those authentication servers. These probe communications may be sent, for example, at the probe interval configured at device 200 (e.g., using a CLI or the like) and stored in storage 208. When there is no response to a probe communication from an authentication server the control circuitry may increment a failed probe count associated with that RADIUS server. When this failed probe count exceeds a (failed probe count) threshold (e.g., which may be configured via a CLI and stored in storage 208), a status of the associated authentication server maintained in storage 208 may be set to an unresponsive state.

Control circuitry 204 is also adapted to receive requests for authentication from hosts and utilize the status associated with these authentication servers for such authentication. When a request for authentication is received at the network device the status of each of the authentication servers can be checked. If the status of all the authentication servers indicate that all the authentication servers are in an unresponsive state, an (unresponsive) action can be taken based on a fallback configuration stored in storage 208 of the network device without actually attempting to authenticate the supplicant at any of the authentication servers. If, however, there are authentication servers associated with a responsive state at the time the request for authentication is received an authentication can be attempted utilizing one or more of those responsive authentication servers. In certain embodiments, the authentication servers used for authentication may be determined using the tracked status for those authentication servers in association with the preferred order of use for those authentication servers configured at device 200 and stored in storage 208.

Figure 3:
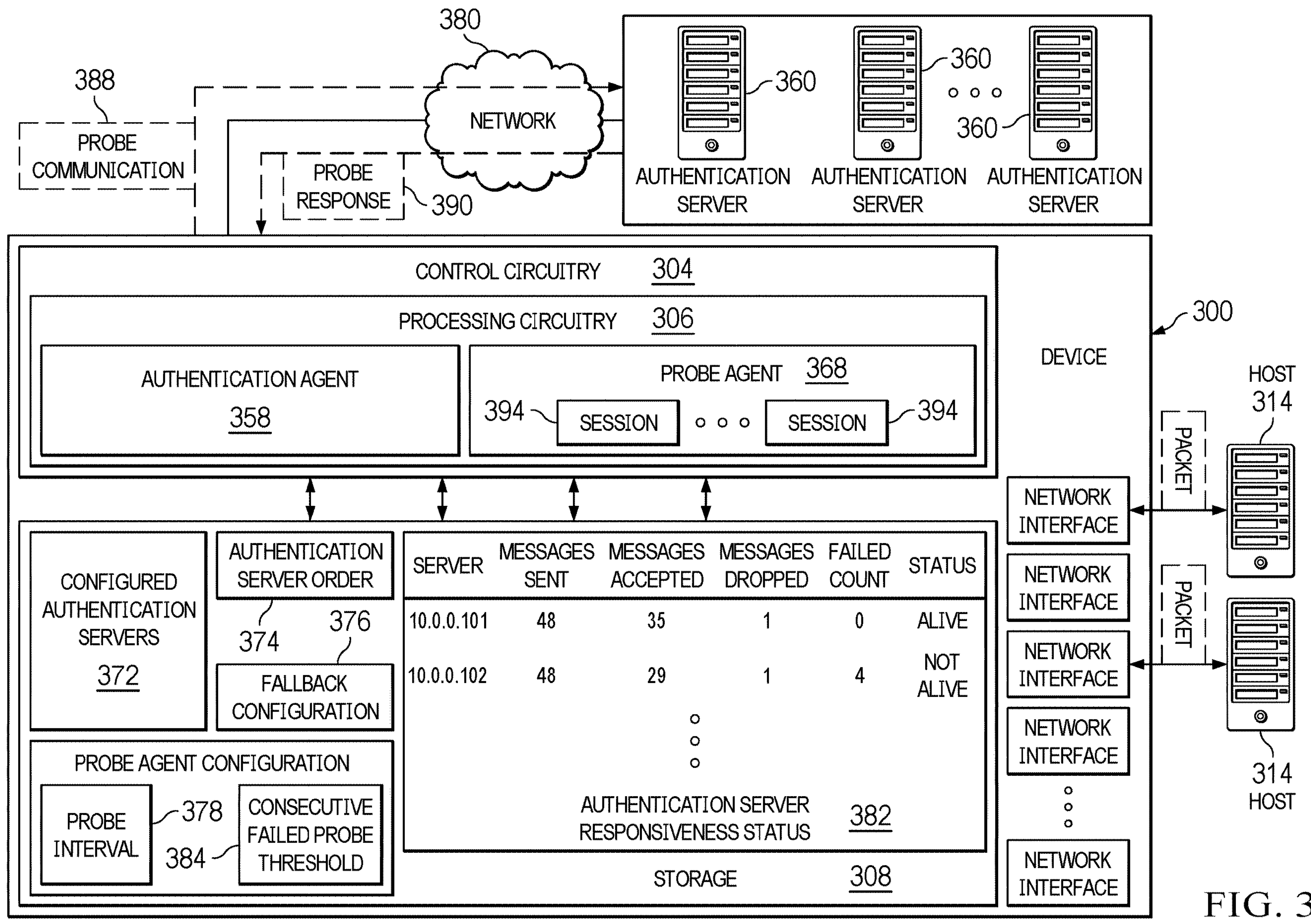
FIG. 3 is a block diagram of one embodiment of a network system including an embodiment of a network device for authentication and placement of hosts using authentication server status.

FIG. 3 is a more detailed depiction of an embodiment of a network system including an network device 300 and one or more authentication servers 360 where device 300 serves as an authenticator in the networked environment. Specifically, authentication agent 358 may be adapted to authenticate hosts 314 using the set of authentication servers 360 based on credentials provided by hosts 314 such that network device 300 can allow, block, or otherwise control network traffic between the hosts 314 and network 380 based on the result of the authentication. Authentication servers 360 may be a RADIUS server or the like configured to receive authentication messages (e.g., authentication requests or the like) from network device 300 and return authentication messages (e.g., authentication responses or the like). Probe agent 368 is adapted to track the responsiveness status of set of authentication servers 314 using probe communication such that the responsiveness status of these authentication servers can be used by authentication agent 358 in the authentication of hosts 314 in the network environment. Authentication agent 358 and probe agent 368 may be implemented in hardware, software, or any suitable combination of hardware and software (e.g., in control circuitry 304). For example, authentication agent 358 and probe agent 368 may be software programs stored on storage 308 (e.g., non-volatile RAM) and executed by processing circuitry 306.

According to one embodiment, authentication agent 358 may be configured to use certain authentication servers 360 for authentication (e.g., using a CLI or the like offered by the network device 300) stored in configured authentication servers 372 comprising a list of those configured authentication servers 360. The configured authentication servers 372 (e.g., identifying data for these configured identification servers 372) may be stored in storage 308 at the network device 300. The configured authentication servers 372 may be identified, for example, by a network (e.g., IP address) associated with the authentication server 360 and one or more ports associated with the authentication server 360 such as an authentication port or an accounting port associated with the authentication server 360. Moreover, the authentication agent 358 may also be configured with a particular authentication server ordering 374 (e.g., hierarchy, priority, etc.) associated with those multiple authentication servers 360 (e.g., an order defining an ordering of the configured authentication servers 372), such that the authentication agent 358 is adapted to attempt authentication of a host 314 utilizing this configured authentication server order 374.

Probe agent 368 is adapted to track the responsiveness status of each of authentication servers 360 in the configured authentication servers 372 configured for use by the authentication agent 358. In particular, the probe agent 368 may establish a session 394 with each of the authentication servers 360 specified in the configured authentication servers 372 based on the data for those authentication servers 360. Thus, as (identifying information for) an authentication server 360 is added or removed from the configured authentication servers 372 configured for the authentication agent 358, a corresponding session 394 with that authentication server 360 may be established or removed by the probe agent 368.

At the beginning of a probe interval 378 (which is a time period such as 300 seconds or the like that may be configured at the network device 300), the probe agent 368 may send a probe communication 388 to each authentication server 360 (e.g., identified in the configured authentication servers 372) using the session 394 established with that authentication server 360. This probe communication 388 can, for example, be a RADIUS Status-Server packet including an identifier associated with that probe communication 388. As it may be desired to determine a status on whether the authentication server 360 is available for authentication of a host 314, such a probe communication 388 may be directed to an authentication port of the authentication server 360 (e.g., as specified in the data for that authentication server 360 included for the configured authentication servers 372).

At the end of the probe interval (e.g., when the probe interval time period has expired and a next probe interval is beginning), probe agent 368 can determine if a (probe) response 390 to the probe communication 388 was received from each authentication server 360 within the probe interval. In one embodiment, for a particular authentication server 360 this determination includes determining if any response 390 to the probe communication 388 sent to that authentication server 360 was received from that authentication server 360 during the probe interval and, if a response was received during that probe interval, if that response 390 is accepted by the probe agent 368. The determination of the acceptability of a response 390 to a probe communication 388 sent at the beginning of the probe interval may include identifying whether any response 390 received from that authentication server 360 within the probe interval is a packet of a particular type (e.g., a RADIUS Access-Accept packet) that includes an identifier that matches the identifier of the probe communication 388 sent at the beginning of the probe interval (e.g., includes that same identifier) with a value for the authentication field (e.g., a Request/Response Authenticator or a Message-Authenticator attribute) that can be authenticated by the probe agent 368.

If no (accepted) response 390 was received from an authentication server 360 during the probe interval, the probe agent 368 may update authentication server responsiveness status data 382 associated with that authentication server 360 accordingly. Specifically, authentication server responsiveness status data 382 may be maintained by probe agent 368 where that authentication server responsiveness status data 382 may include an identifier associated with each configured authentication server 360 (e.g., an IP address or the like) and an associated status indicating a responsiveness of that authentication server 360 (e.g., "alive", "not alive", "up", "down", etc.). The authentication server responsiveness status data 382 for an authentication server 360 also includes a failed probe count that indicates a number of (e.g., consecutive) probe communications 388 for which no accepted response was received from that authentication server 360. The authentication server responsiveness status data 382 may also include other data associated with each authentication server 360, including for example, the number of probe communications sent (e.g., "messages sent") to that authentication server 360 since that authentication server 360 was configured for use by authentication agent 358, the number of accepted probe responses received from that authentication server 360 (e.g., "messages accepted"), and data regarding responses that may have been received from the authentication server 360 but were not determined to be acceptable response to the probe communications 388 (e.g., were not received before the expiration of the probe interval, were not a proper type of packet, could not be authenticated, etc.).

Thus, if no (accepted) response 390 was received from an authentication server 360 during the probe interval, the probe agent 368 may increment the failed probe count associated with the authentication server in authentication server responsiveness status data 382. Additionally, the probe agent 368 may update the other authentication server responsiveness status data 382 associated with the authentication server 360 such as the "messages sent", the "messages accepted" or the "messages dropped" associated with the authentications server 360. The probe agent 368 can then determine if the failed probe count associated with that authentication server 360 exceeds a threshold (e.g., a consecutive failed probe count threshold 384 that may be configured at device 300 in association with the probe agent 368). In some cases, this failed probe count threshold may be a single failed communication (e.g., a threshold of one), while in other embodiments this threshold may be higher such as, three, five or ten consecutive failed probe.

If, however, probe agent 368 determines that an acceptable response was received from an authentication server 360 during the probe interval, the failed probe count associated with the authentication server may be reset (e.g., to zero) in authentication server responsiveness status data 382 (and if the responsiveness status of the authentication server 360 is unresponsive it may be changed to responsive). Additionally, the probe agent 368 may update the other authentication server responsiveness status data 382 associated with the authentication server 360 such as the "messages sent" or the "messages accepted" associated with the authentications server 360.

The device 300 or the probe agent 368 may thus offer an interface (e.g., a CLI or the like) that allows the authentication server responsiveness status data 382 for the authentication servers 360 to be displayed. For example, different commands may allow the display of two (or more) levels of detail of authentication server responsiveness status data 382 (examples of which are given below):

status of the determined authentication servers 360 in authentication server responsiveness status data 382 indicates that the authentication server 360 is in a responsive state (e.g., has an associated "Alive" status in the authentication server responsiveness status data 382), authentication agent 358 may attempt an authentication of the host 314 using the determined authentication server 360. During an authentication of a host 314, authentication agent 358 may send an authentication message (e.g., an authentication or access request, a challenge request, etc.) to the authentication server 360. The authentication server 360 may return a result such as an authentication message (e.g., an access-accept response, access-reject, access-challenge response, etc.). The result of such an authentication attempt may be utilized by authentication agent 358 if a response is received from the authentication server 360. If however, the authentication attempt using the determined authentication server 360 times out, or no response is otherwise received, if there are any remaining configured authentication servers 360 that have not been utilized to attempt authentication of the host 314, authentication agent 358 may determine another authentication server 360 to be utilized to attempt authentication. Authentication agent 358 may then attempt an authentication of the host 314 using this newly determined authentication server 360 (e.g., if that newly determined authentication server 360 status is responsive).

| Probe method: Status-Server packet | | | | |
|---|---|---|---|---|
| RADIUS Server | Messages Sent | Messages Accepted | Messages Dropped | Status |
| 10.0.0.101 | 48 | 35 | 1 | alive |
| 10.0.0.102 | 48 | 29 | 1 | not alive |

Probe method: Status-Server packet

RADIUS server: 10.0.0.101, Authentication port: 33922, Accounting port: 34685
Status: alive, Last changed: 0:02:32 ago
Last probed: 0:00:02 ago
Last successful probe: 0:00:02 ago, Failed probes since then: 0
Messages sent: 48
Messages accepted: 35
Messages dropped: 1
Last time counters were cleared: never RADIUS server: 10.0.0.102, Authentication port: 34406, Accounting port: 47258
Status: not alive, Last changed: 0:00:12 ago
Last probed: 0:00:02 ago
Last successful probe: 0:00:27 ago, Failed probes since then: 4
Messages sent: 48
Messages accepted: 29
Messages dropped: 1
Last time counters were cleared: never This authentication server responsiveness status data 382 is utilized by authentication agent 358 when authenticating hosts 314. In one embodiment, when a request for authentication is received from a host 314 by the authentication agent 358 at the network device 300 the authentication agent 358 can determine an authentication server 360 to use to attempt authentication. In some embodiments, the authentication agent 358 may utilize the configured order of the authentication servers 372 to determine an authentication server 360 highest in the configured order of the authentication servers 372 (e.g., that has not already been utilized to attempt authentication).

The authentication agent 358 can then check the status of this determined authentication server 360 by accessing authentication server responsiveness status data 382. If the At any point, if the status of a determined authentication servers 360 in authentication server responsiveness status data 382 indicates that the authentication server 360 is in an unresponsive state (e.g., have an associated "Not Alive" status), authentication agent 358 may immediately (i.e., without attempting an authentication of the host 314 using that determined authentication server 360) determine another authentication server 360 to be utilized to attempt authentication (e.g., if there are any remaining configured authentication servers 360 that have not been utilized to attempt authentication of the host 314). Authentication agent 358 may then attempt an authentication of the host 314 using this newly determined authentication server 360. In this manner, attempts to authenticate a host 314 using unresponsive authentication servers 360 may be avoided.

Accordingly, each of the authentication servers 360 indicated as responsive (if any) may be utilized to attempt authentication by authentication agent 358. When attempts have been made to authenticate the host 314 using any authentication servers 360 indicated as responsive in authentication server responsiveness status data 382 (e.g., and no response has been received to any authentication attempted), an unresponsive action can be taken by the authentication agent 358. For example, a fallback configuration 376 for an authentication failure may be configured at the network device 300 (e.g., using a CLI or the like). When it is determined that all the authentication servers 360 are in an unresponsive state (or any authentication attempts have timed out), the authentication agent 358 may take the fallback action in this fallback configuration 376. For example, the host 314 may be immediately placed in an unresponsive VLAN.

Thus, in cases where the authentication server responsiveness status data 382 indicates all the authentication servers 360 are in an unresponsive state, such an unresponsive action may be taken without actually attempting authentication of the host 360 with any authentication server 360. If, subsequent to the determination that all the authentication servers 360 are unresponsive and the taking of the unresponsive action, it is determined that an authentication server 360 is now in a responsive state, an authentication of the host 314 may occur at that point (e.g., with the now responsive authentication server 360). Similarly, even in instances where authentication server responsiveness status data 382 indicates one or more authentication servers 360 are in a responsive state, attempts at authenticating the host 314 using unresponsive authentication server 360 may be avoided (even in cases where they may be higher in a configured usage order than those authentication servers 360 indicated as responsive).

Figure 4:
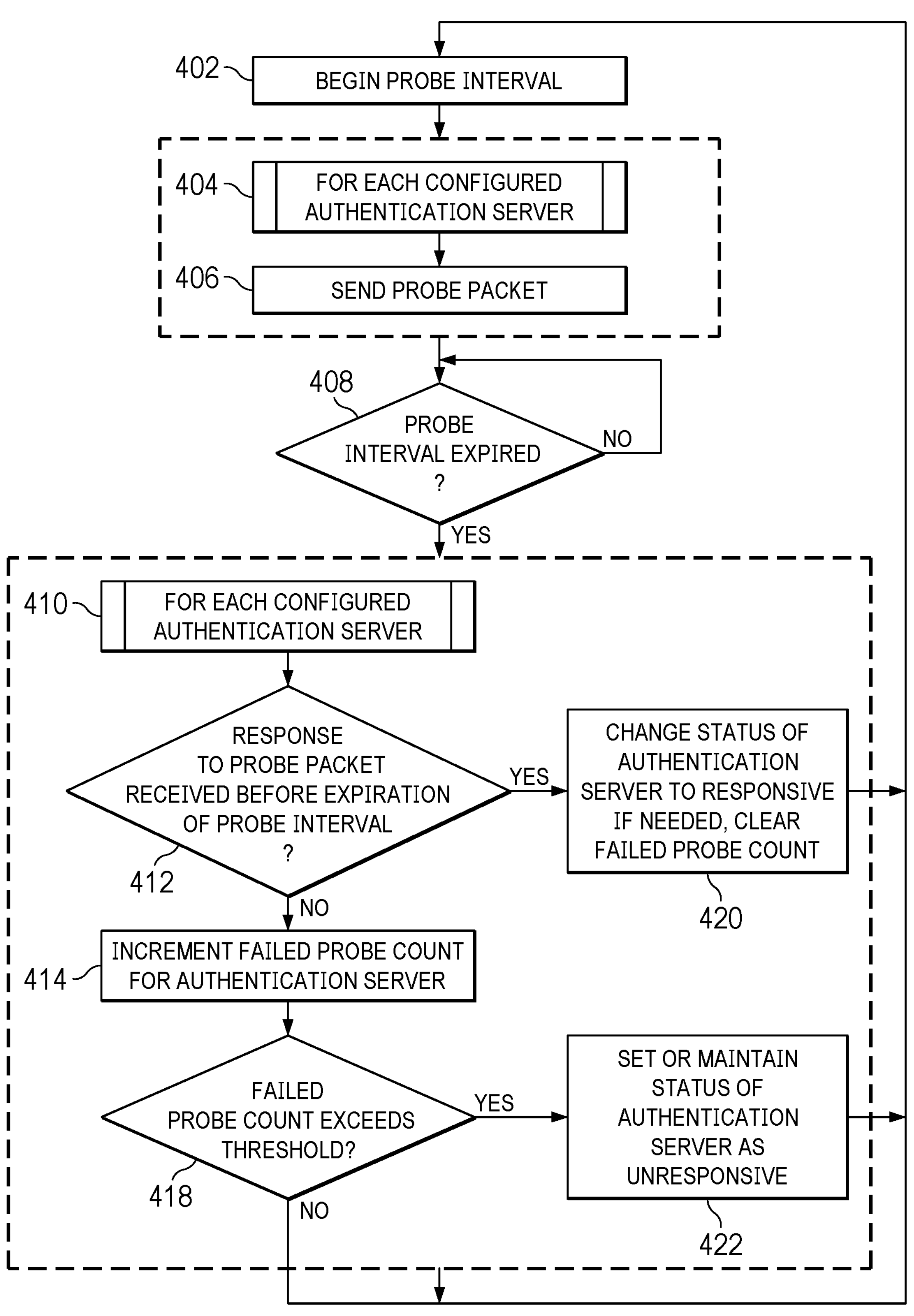
FIG. 4 is a flow diagram for one embodiment of a method for determining status for authentication servers.
Figure 5:
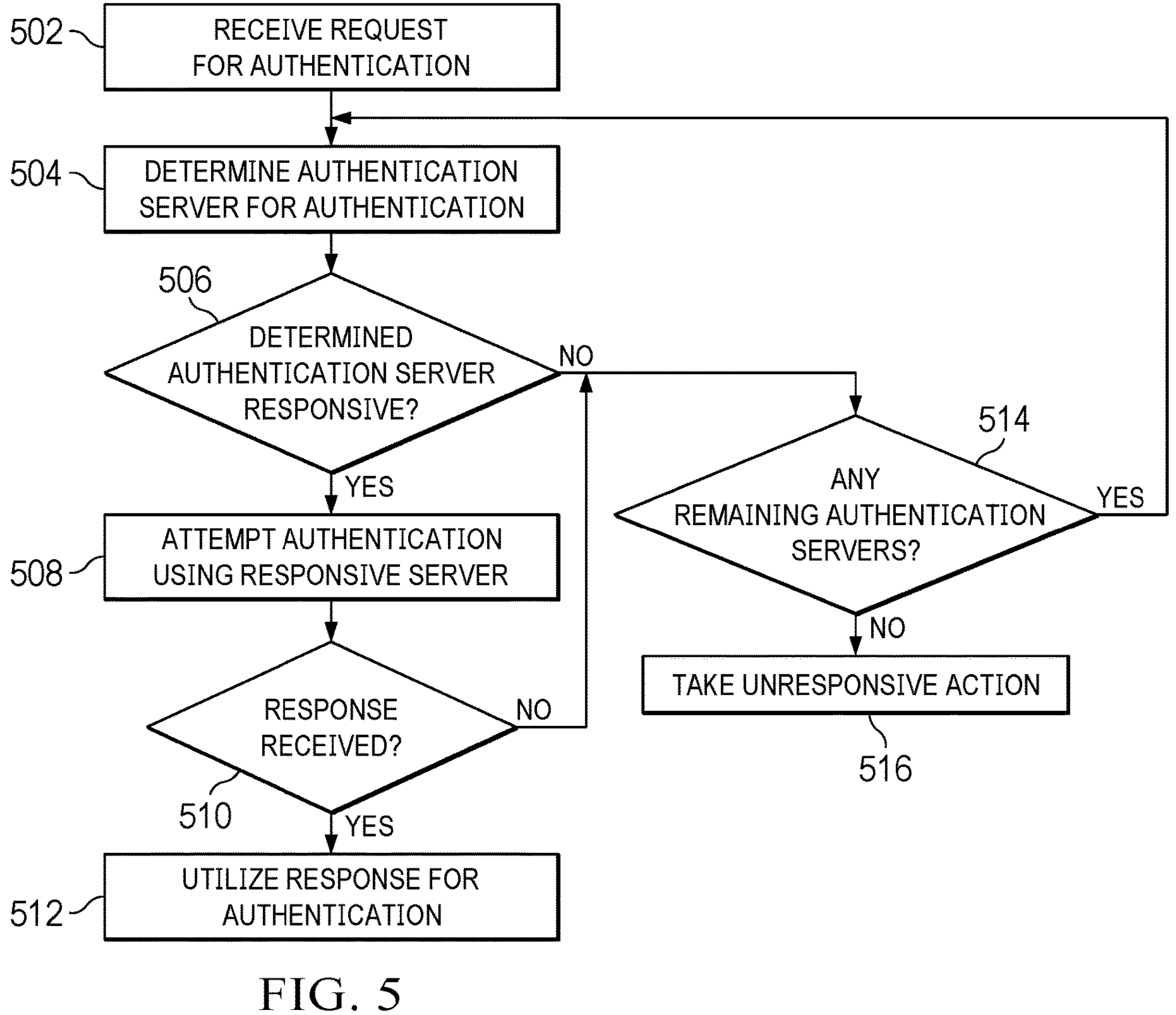
FIG. 5 is a flow diagram for one embodiment of a method for authentication or placement of hosts based on authentication server status.

Turning to FIGS. 4 and 5, are flow diagrams for embodiments of methods that may be implemented by a network device for determining status for authentication servers and use of that status for placement of hosts. Initially looking at FIG. 4, a flow diagram for one embodiment of determining or tracking a responsiveness status of each of a set of authentication servers is depicted. Such tracking may be done on a periodic basis using a probe interval. At the beginning of a probe interval (STEP 402) (which is a time period such as 300 seconds or the like that may be configurable), a probe communication may be sent to each of the authentication servers (e.g., identified for use in authentication at a network device) (STEPS 404, 406). These probe communications can be sent, for example, using a session established with that authentication server. A probe communication can, for example, be a RADIUS Status-Server packet including an identifier associated with that probe communication.

At the end of the probe interval (e.g., when the probe interval time period has expired and a next probe interval is beginning) (Y branch of STEP 408), it can be determined if a (probe) response to the probe communication sent during that probe interval was received from each authentication server within the probe interval (STEPS 410, 412). In one embodiment, for a particular authentication server this determination includes determining if any response to the probe communication sent to that authentication server was received from that authentication server during the probe interval and, if a response was received during that probe interval, if that response is acceptable. The determination of the acceptability of a response to a probe communication sent at the beginning of the probe interval may include identifying whether any response received from that authentication server within the probe interval is a packet of a particular type (e.g., a RADIUS Access-Accept packet) that includes an identifier that matches the identifier of the probe communication sent at the beginning of the probe interval (e.g., includes that same identifier) with a value for the authentication field (e.g., a Request/Response Authenticator or a Message-Authenticator attribute) that can be authenticated.

If no (accepted) response was received from an authentication server during the probe interval (N branch of STEP 412), a failed probe count associated with that authentication server that indicates a number of (e.g., consecutive) probe communications for which no accepted response was received from that authentication server may be incremented (STEP 414). It can then be determined if the failed probe count associated with that authentication server exceeds a threshold (e.g., a consecutive failed probe count threshold that may be configurable) (STEP 418). If the failed probe count associated with that authentication server exceeds this failed probe count threshold (Y branch of STEP 418) the status associated with the authentication server may be set to (or maintained as) the unresponsive state (e.g., "Not Alive") (STEP 422).

If, however, it is determined that an acceptable response was received from an authentication server during that probe interval (Y branch of STEP 412), the failed probe count associated with the authentication server may be reset (e.g., to zero) (and if the responsiveness status of the authentication server 360 is unresponsive, it may be changed to responsive) (STEP 420).

Moving now to FIG. 5, one embodiment of a method for utilizing such authentication server responsiveness status for host placement is depicted. Initially, a request for authentication is received from a host at a network device (STEP 502). It will be noted that the reception and processing of such authentication requests may be done asynchronously to the tracking of the status of the authentication servers as discussed above. In response to such a request for authentication, an authentication server to use to attempt authentication may be determined (STEP 504). In some embodiments, the authentication agent may utilize a configured order of the authentication servers to determine an authentication server highest in this configured order of the authentication servers (e.g., that has not already been utilized to attempt authentication).

The authentication agent can then check the responsiveness status of this determined authentication server by accessing authentication server responsiveness status data associated with the authentication server. If the status of the determined authentication server indicates that this authentication server is in a responsive state (Y branch of STEP 506), an authentication of the host can be attempted using the determined authentication server (STEP 508). Here, an authentication message (e.g., an authentication or access request, a challenge request, etc.) may be sent to the determined authentication server. That authentication server may return a result such as an authentication message (e.g., an access-accept response, access-reject, access-challenge response, etc.). Thus, if a response to the attempted authentication of the host is received from the authentication server (Y branch of STEP 510) the result of the authentication attempt may be utilized in the authentication of the host (e.g., to authenticate, or reject authentication of, the host) (STEP 512). If, however, the authentication attempt using the determined authentication server times out, or no response is otherwise received (N branch of STEP 510), if there are any remaining configured authentication servers that have not been determined for use in authentication of the host (Y branch of STEP 514), another authentication server to be utilized for authentication may be determined (e.g., an authentication server not previously utilized to attempt authentication). This next authentication server may, for example, be the next authentication server in the configured order of authentication servers.

If the status of a determined authentication server indicates that the determined authentication server is in an unresponsive state (N branch of STEP 506), if there are any remaining configured authentication servers that have not been determined for use in authentication of the host (Y branch of STEP 514), another authentication server to be utilized for authentication may be immediately determined (e.g., an authentication server not previously utilized to attempt authentication) (STEP 504) without attempting an authentication of the host using that determined authentication server. In this manner, attempts to authenticate a host using an unresponsive authentication server may be avoided.

Accordingly, each of the authentication servers indicated as responsive (if any) may be utilized to attempt authentication by authentication agent. If, at some point, there are no remaining authentication servers (e.g., there are no authentication servers that have a responsive status, or attempts to authenticate the host using all authentication servers indicated as responsive have failed) (N branch of STEP 514), an unresponsive action can be taken (STEP 516). For example, a fallback configuration for an authentication failure, such as placing the host in an unresponsive VLAN may be taken. Thus, in cases where the authentication server responsiveness status data indicates all the authentication servers are in an unresponsive state, such an unresponsive action may be taken without actually attempting (e.g., real-time) authentication of the host with any authentication server and authentication attempts using unresponsive hosts may be avoided.

It will be understood that while specific embodiments have been presented herein, these embodiments are merely illustrative, and not restrictive. Rather, the description is intended to describe illustrative embodiments, features and functions in order to provide an understanding of the embodiments without limiting the disclosure to any particularly described embodiment, feature, or function, including any such embodiment, feature, or function described. While specific embodiments of, and examples for, the embodiments are described herein for illustrative purposes only, various equivalent modifications are possible within the spirit and scope of the disclosure, as those skilled in the relevant art will recognize and appreciate.

As indicated, these modifications may be made in light of the foregoing description of illustrated embodiments and are to be included within the spirit and scope of the disclosure. Thus, while particular embodiments are described, a latitude of modification, various changes and substitutions are intended in the foregoing disclosures, and it will be appreciated that in some instances some features of embodiments of the disclosure will be employed without a corresponding use of other features, and features described with respect to one embodiment may be combined with features of other embodiments without departing from the scope and spirit of the disclosure as set forth.

What is claimed is:

1. A method for authenticating hosts in a network, comprising:

tracking a status of each of a plurality of RADIUS authentication servers in a network, wherein tracking the status comprises periodically sending a RADIUS Status-Server packet to each of the plurality of servers at a probe interval, incrementing a failed probe count when no response is received, and setting a responsiveness status associated with each RADIUS authentication server to unresponsive when a failed probed count exceeds a failed probe count threshold for that RADIUS authentication server;

receiving a request for authentication from a host;

based on a determination that the responsiveness status of each of the RADIUS authentication servers indicates that all of the RADIUS authentication servers are unresponsive, taking an associated unresponsive action configured at a network device without attempting authentication of the host with the plurality of authentication servers, wherein the unresponsive action comprises placing the host into an unresponsive virtual local area network (VLAN) based on a fallback configuration stored at the network device, the unresponsive VLAN providing a limited level of access to the network;

subsequently determining that one of the RADIUS authentication servers is in a responsive state; and attempting authentication of the host with the responsive RADIUS authentication.

2. The method of claim 1, wherein the probe interval is different for different ones of the RADIUS authentication servers.

3. The method of claim 2, wherein the plurality of RADIUS authentication servers are configured at the network device.

4. The method of claim 1, wherein the unresponsive action comprises another fallback action.

5. A network device, comprising:

a processor;

a non-transitory computer readable medium, comprising instructions for:

tracking a status of each of a plurality of RADIUS authentication servers coupled to the network device, wherein tracking the status of the RADIUS authentication servers comprises sending a RADIUS Status-Server packet communication to each of the plurality of RADIUS authentication servers at a probe interval, incrementing a failed probe count when no response is received, and setting a responsiveness status associated with each of the RADIUS authentication servers to unresponsive when the failed probe count exceeds a failed probe count threshold;

receiving a request for authentication from a host;

based on a determination that the responsiveness status of each of the RADIUS authentication servers indicates that all of the RADIUS authentication servers are unresponsive, taking an associated unresponsive action configured at a network device without attempting authentication of the host with the plurality of RADIUS authentication servers, wherein the unresponsive action comprises placing the host into an unresponsive virtual local area network VLAN) based on a fallback configuration stored at the network device, the unresponsive VLAN providing a limited level of access to the network;

determining a first RADIUS server of the plurality of RADIUS servers based on the responsiveness status of the plurality of RADIUS server, wherein the responsiveness status of the first RADIUS server indicates that the first RADIUS server is responsive, and attempting authentication of the host using the first RADIUS server.

6. The network device of claim 5, wherein the first RADIUS authentication server is a highest ordered RADIUS authentication server in an order of RADIUS servers configured at the network device.

7. The network device of claim 6, wherein the instructions are further for:

determining that no response was received to the attempted authentication of the host using the first RADIUS authentication server;

in response to the determination that no response was received to the attempted authentication, determining a second RADIUS authentication server of the plurality of RADIUS authentication servers based on the responsiveness status of the plurality of RADIUS authentication server, wherein the responsiveness status of the second RADIUS authentication server indicates that the second RADIUS authentication server is responsive; and attempting authentication of the host using the second RADIUS authentication server.

8. The network device of claim 7, wherein the second RADIUS authentication server is a next highest ordered RADIUS authentication server in the order of RADIUS authentication servers configured at the network device.

9. The network device of claim 5, wherein the plurality of RADIUS authentication servers are configured at the network device.

10. A method for authenticating hosts in a network, comprising:

determining, at a network device, a set of RADIUS authentication servers used for authentication of hosts on a network;

tracking status on each of the set of RADIUS authentication serves by periodically, at a probe interval, performing the steps of:

sending a probe communication from the network device to each RADIUS authentication server of the set of authentication servers, wherein the probe communication is a RADIUS Status-Server packet;

determining, at the network device, if a probe response to the probe communication was received from each RADIUS authentication server;

in response to determining that no probe response was received from any one of the RADIUS authentication servers, incrementing a failed probe count associated with that authentication server, and when the failed probe count associated with that authentication server is above a failed probe count threshold, setting a responsiveness status associated with that RADIUS authentication server at the network device to indicate that authentication server is unresponsive; and asynchronously to the status tracking of set of RADIUS authentication servers, receiving, at the network device, a request for authentication from a host;

determining a first RADIUS authentication server of the set of RADIUS authentication servers to use for authentication of the host;

based on a determination that the responsiveness status of each of the RADIUS authentication servers indicates that all of the RADIUS authentication servers are unresponsive, taking an associated unresponsive action configured at the network device without attempting authentication of the host with the plurality of RADIUS authentication servers, wherein the unresponsive action comprises placing the host into an unresponsive virtual local area network VLAN) based on a fallback configuration stored at the network device, the unresponsive VLAN providing a limited level of access to the network;

subsequently determining that one of the RADIUS authentication servers is in a responsive state; and attempting authentication of the host with the responsive RADIUS authentication server.

11. The method of claim 10, wherein the probe interval is different for different ones of the RADIUS authentication servers.

12. The method of claim 10, wherein determining if the probe response to the probe communication was received from each RADIUS authentication server comprises determining if the response to the probe communication was received at the network device and when the response was received, determining if that response is an acceptable response.

13. The method of claim 12, wherein determining if that response is the acceptable response comprises determining if the response to the probe communication was received within the probe interval.

14. The method of claim 12, wherein the probe communication is a RADIUS Status-Server packet, and determining if that response is the acceptable response comprises determining if the response to the probe communication is a RADIUS Access-Accept packet.

15. The method of claim 12, wherein determining if that response is the acceptable response comprises determining if the response is associated with an identifier of the probe communication.

16. The method of claim 12, wherein determining if that response is the acceptable response comprises determining if the response can be authenticated by the network device.

* * * * *